Sept. 20, 1966     D. O. TAYLOR     3,273,229
REGISTERING DEVICE FOR GAP SPACING
Filed Dec. 4, 1964     2 Sheets-Sheet 1
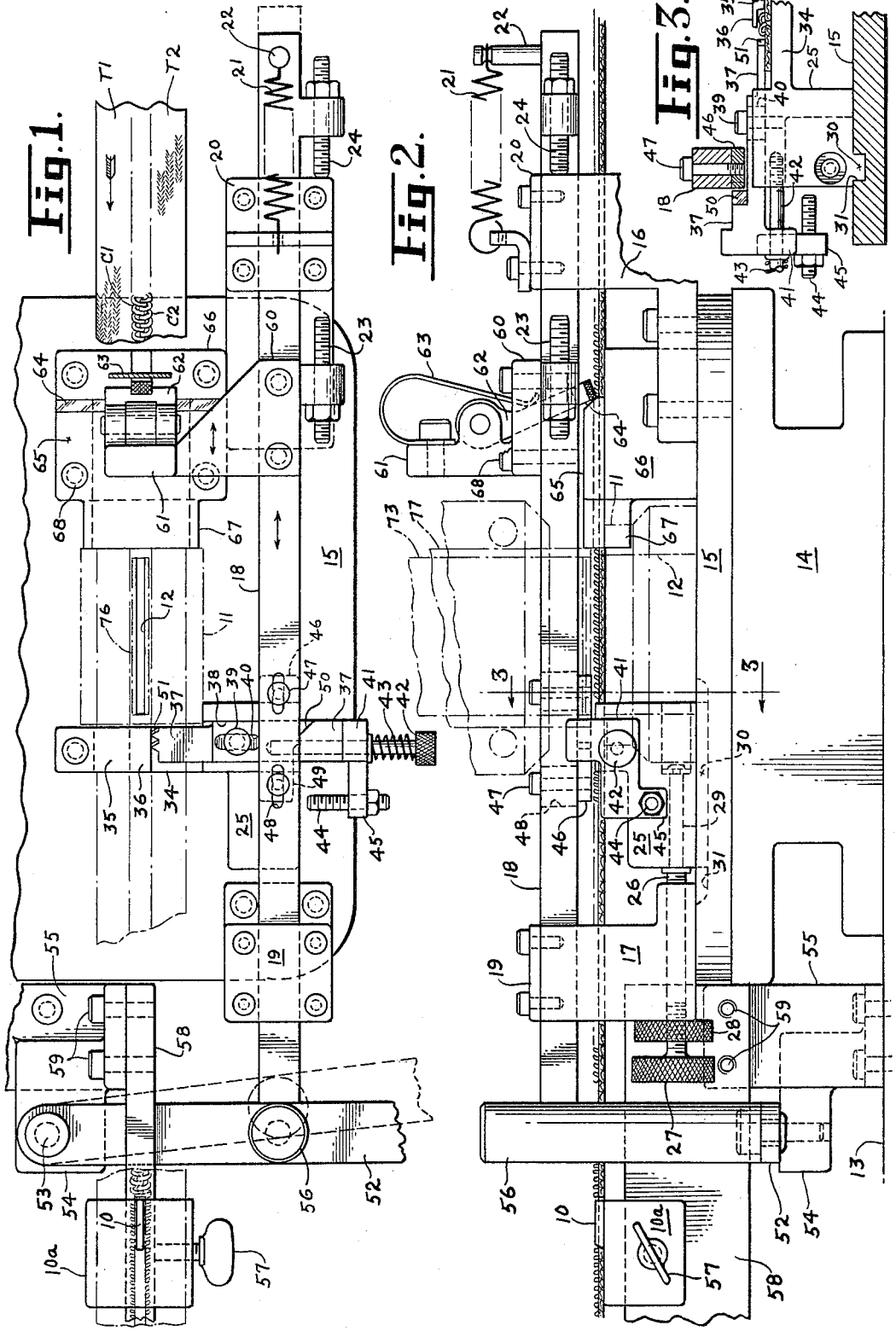

Sept. 20, 1966    D. O. TAYLOR    3,273,229
REGISTERING DEVICE FOR GAP SPACING
Filed Dec. 4, 1964    2 Sheets-Sheet 2
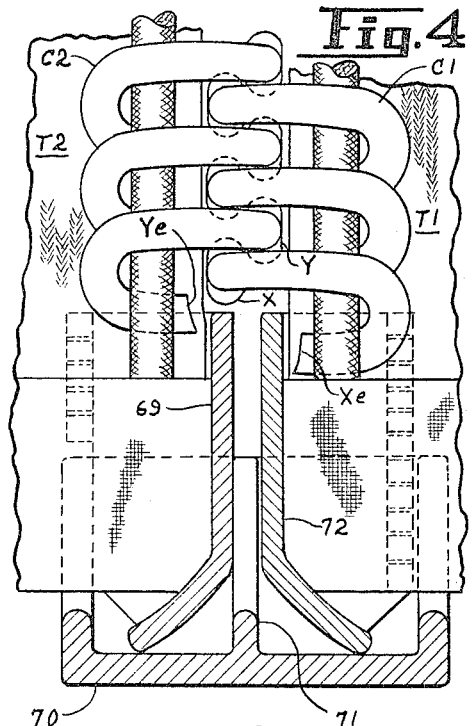
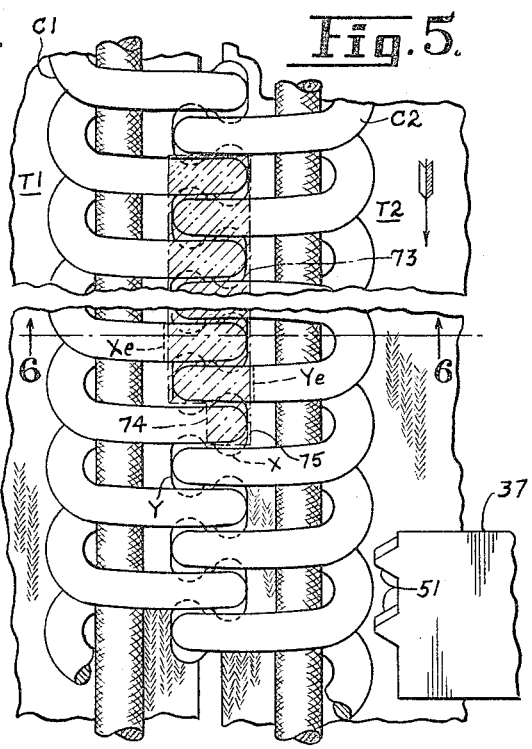
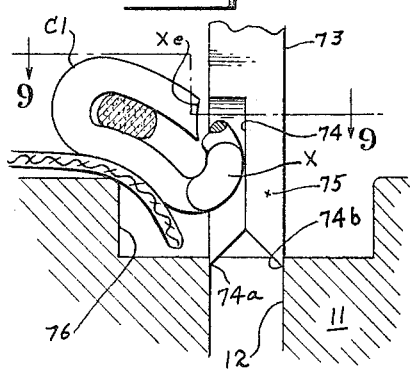
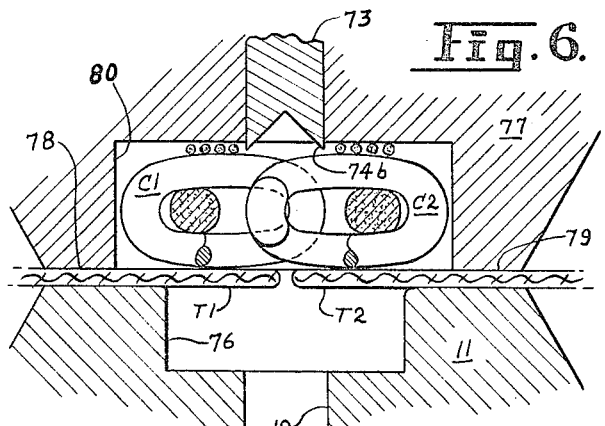
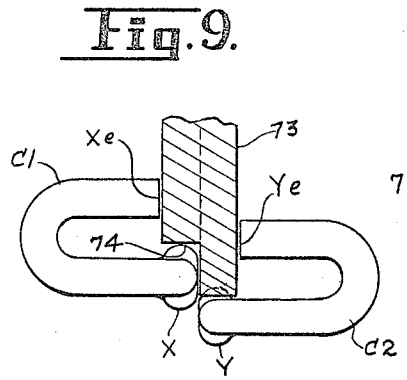
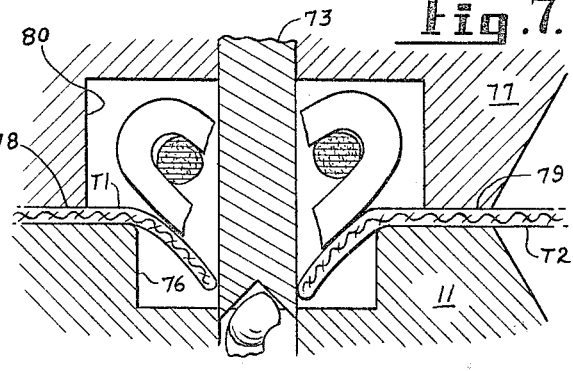

United States Patent Office 3,273,229
Patented Sept. 20, 1966

3,273,229
REGISTERING DEVICE FOR GAP SPACING
Donald O. Taylor, Waterbury, Conn., assignor to Scovill
 Manufacturing Company, Waterbury, Conn., a corporation of Connecticut
Filed Dec. 4, 1964, Ser. No. 416,037
6 Claims. (Cl. 29—200)

This invention is a machine for cutting gaps in continuous zipper chain of the plastic filament type. The term "zipper chain" includes the two interlocked plastic filament coils.

In order to properly finish the ends of zipper fasteners of the plastic filament type, it is necessary to cut gaps in the continuous lengths of filaments without injuring the fabric to which the coils are attached.

It is also important to register the chain with reference to the cutting tools so that the gap will be accurately placed and especially in the case of zippers of the separating bottom end type, it is important that one coil—preferably that on the pin side—be cut so as to provide an end lower than the cut end on the tube side. In pursuing this objective, the machine provides in addition to a normal stop against which a terminal portion of the chain may be placed, a further accurate indexing or registering device closely adjacent the cutting tools to make certain the chain is located so that the cut end on one side will be located in the precise place desired; that is, the bottom end of the coil on the pin side will be located one-half of the coil pitch below the end of the coil on the tube or retainer side of the zipper.

Other objects and advantages will hereinafter more fully appear.

In the accompanying drawings, I have shown for purposes of illustration, one embodiment which the invention may assume in practice. In these drawings:

FIG. 1 is a plan view of a machine according to the invention;

FIG. 2 is a front elevation of the machine;

FIG. 3 is a sectional line on 3—3 of FIG. 2;

FIG. 4 is a front view of the bottom portion of a completed zipper for which my machine is particularly suited, with the bottom fittings in section;

FIG. 5 is a top plan view showing the cutting operation;

FIG. 6 is a cross-section on line 6—6 of FIG. 5;

FIG. 7 is a similar cross-section after completion of a cutting operation;

FIG. 8 is a detailed view looking at the front of the cutting blade in elevation; and FIG. 9 is a horizontal plan view on line 9—9 of FIG. 8.

In this description, one side of the fastener which is adapted to carry the pin of the separable bottom connection will be referred to as the "pin side" while the other, adapted to carry the retainer of a separable bottom end, will be referred to as the "tube side."

The machine for accurately locating and cutting a gap in the continuous fastener chain has its essential parts illustrated in FIGS. 1 and 2. Here the tape on the pin side is designated T1 which carries the coil filament C1, while on the tube side, the tape is designated T2 and its coil C2.

This chain is moved through the machine in a horizontal position in the direction of the arrow as shown in FIG. 1, and is roughly located for cutting the gap by abutting the endmost coils against a stop 10 which is in the form of a narrow projection adapted to extend into a previously cut gap. In FIG. 1, the cutting blade and clamping tools are removed so as to indicate the cutting die 11 which has the slot 12 whose length will be that desired for the length of the gap.

The various parts of the machine are supported from a table 13 mounting a pedestal 14 to which may be secured a horizontal bed plate 15. Upon the plate 15 are mounted the stationary support brackets 16 and 17 which are provided with rectangular grooves at the top for supporting and guiding an operating slide bar 18 held in place by retainer plates 19 and 20. The slide bar 18 is continuously urged toward the left by means of a tension spring 21 attached at one end to the stationary support bracket 16, and at the other end, to a pin 22 on the slide bar 18. The slide bar is capable of only a short movement from its normal position as shown in FIGS. 1 and 2, and is limited by an adjustable stop 23 suitably mounted on the slide bar 18 coming into abutment with the vertical face of bracket 16. A similar adjustable stop pin 24 limits the movement of the slide under the influence of spring 21 by engagement with the opposite vertical face of bracket 16.

The precise locating device will now be described. It is normally stationary, but is adjustable longitudinally of the fastener chain by means of a screw 26 threaded in the bracket 17 and operated by a knob 27 and locked by a nut 28. This screw 26 is journalled in a hole 29 in the block 25 and the screw carries suitable collars at opposite ends of this hole so that the block 25 can be adjusted by turning the screw 26. As seen in FIG. 3, the block 25 is held in any adjusted position by means of a key 30 which fits in a keyway 31 in the plate 15.

The block 25 has a cantilever extension 34 extending transversely across the machine, and its opposite end carries a guide 35 having an overhanging flange 36 adapted to overlie the coils of the fastener chain (see FIG. 3). A transverse slide 37 is mounted for transverse movement in a guide channel 38 of the block 25. A capscrew 39 passes through a slot 40 in the slide and into the block 25 to maintain the slide in the guide channel 38. The slide 37 has a boss 41 at its outer end through which extends a screw 42 adjustably threaded in the block 25, and a coil spring 43 around the screw normally urges the slide inwardly. The inward travel of the slide 37 is limited by a stop screw 44 which extends through an arm 45 integral with the boss 41, the screw 44 being adapted to abut against the block 25, as seen in FIG. 3.

When the operating bar 18 is moved from righ to left by the spring 21, the transverse slide 37 will be cammed to its outer position, which is the position shown in FIG. 1. This is accomplished by means of a cam plate 46 adjustably secured to the underside of the slide bar 18 by cap screws 47 extending through elongated slots 48. The outline of this cam plate is indicated in dotted lines in FIG. 1 and it is shown in section in FIG. 3. The left end of the cam plate is cut away as indicated at 49 so that when the bar 18 is moved to the right, a shoulder 50 of the slide will snap into this cut-out 49 to allow the transverse slide 37 to snap inwardly until the stop inwardly until the stop screw 44 abuts the block 25. When this is done, the pointed teeth 51 at the end of the slide, which may be two in number, will engage in the spaces between the coil convolutions and in doing so, will shift the fastener chain slightly if necessary, so that the teeth will register with the space between the coils.

For this purpose, the slide bar 18 is manually operated toward the right against the tension of spring 21. This is done by means of a hand lever 52 pivoted at 53 to a boss 54 of a support bracket 55 which in turn, is secured to the table 13. The movement of this hand lever 52 from one extreme position to another is indicated by the full lines and dotted lines in FIG. 1. This lever extends beneath the fastener chain and has an upright pin 56 in position to register with the end of bar 18.

The previously mentioned stop member 10 for the initial registry of the fastener chain projects upwardly from a movable block 10a slidably mounted on an elongated plate 58 and held in adjusted position along said plate as by a thumb screw 57. That end of the plate 58 adjacent the gapping machine is held in elevated position by the support bracket 55 and screws 59, and the opposite end of said plate 58 may be supported by a similar bracket (not shown).

Means are provided for insuring that the teeth 51 will not lodge or jam against the coils of the fastener chain, but rather, enter into the spaces between the coils. Secured to the top of the slide bar 18 is a tranversely extending bracket 60 having an upright portion 61 to which is pivoted a swinging catch 62 having its bottom end rubber-tipped and adapted to bear upon the upper side of the interlocked coils C1 and C2. It is normally urged in a clockwise direction by means of a leaf spring 63 attached to the bracket upright portion 61. When the bar 18 is manually moved to the right, this catch will frictionally engage the coils and apply force to the right. If the teeth 51 are already caught properly in the coil, this will merely stretch the coil slightly, but if the teeth 51 are lodged against the coils, it will move the chain just enough to allow the teeth to snap into place between the coils. This insures an extremely accurate registry of the individual coils of the fastener chain with respect to the slot 12 in the cut-out die 11.

When the hand lever 52 is released and the bar 18 moved to the left, the catch 62 will be lifted out of the way by engaging with the beveled end 64 of a plate 65, in which plate is formed a suitable guide channel for the fastener chain. This plate is co-extensive with and attached to another support block 66 having an overhang 67, the block 66 being in turn anchored to the main support plate 15 by suitable screws 68. These screws 68 are not shown in FIG. 2 in order to avoid crowding of the lines.

The bottom portion of a zipper of the separating bottom type, as seen in FIG. 4, has the coil C2 on the tube side wherein there is anchored a tube 69 to which is firmly attached the box-shaped retainer 70 which is of a common well-known construction used in metal zippers. In addition to the portion which surrounds the tube 69, it provides an elongated channel 71 for receiving the pin 72 attached to tape T1 which carries the coil C1.

It is desired to cut the chain so that the lowermost head, here designated X, is on the coil C1 and the cut end of this coil, designated X2 is below the head so that it can be gripped firmly in the pin 72. The cut end of coil C2, which is here designated Ye, is above the cut end Xe and may or may not be gripped by the tube 69. The bottom head Y of the coil C2 is just above the head X so that it can be engaged between the head X and the next adjacent coil convolution.

To produce this construction, it will now be observed that it is important not only to register the chain with extreme accuracy between the cutting die and the cutting tool, but also to provide a novel form of cutting tool. The position of the chain during cutting, as seen in FIGS. 5 to 9 inclusive, is just the opposite to that shown in the finished fastener of FIG. 4.

The coil-severing tool is in the form of a cutting blade 73 (shown in phantom in FIGS. 2 and 5), and the arrow in FIG. 5 indicates the direction of the feed of the chain. The left or front end of this tool cuts the ends Xe and Ye of the coils to form what is to become the bottom end of the coils in the finished zipper of FIG. 4, so that in order to relate FIG. 5 with the other figures, it will be considered in reverse.

In order to cut the two coils in the manner described and in order to save the head X, the front end of the cutting blade 73 is relieved at one side as indicated at 74. When the blade 73 descends, the cutting end 74a of the blade 73 adjacent the relief 74 will cut through the pin coil at Xe and leave the head X resting unharmed in the relief 74. The opposite cutting edge of the blade, as indicated at 74b, will cut the tube coil at Ye and then the head-carrying portion of the severed coil with its head Y will be disposed ahead of or below the projecting portion of the blade as indicated at 75. Thus, when the fastener is turned around from the positions of FIGS. 5 and 9, the cut end Xe will be lowermost in position to properly receive the pin 72.

As seen in FIGS. 6 and 7, the die 11 is provided with a groove 76 which is substantially wider than the slot 12 that accommodates the cutting blade 73. When the upper head of the punch-carrying blade 73 descends, the pad 77, which may be spring mounted on the punch head in a well-known manner, has the wide portions 78 and 79 which grip the zipper tapes against the top surface of the die 11. This spring pad 77 is grooved out as indicated at 80 to accommodate the coils of the fastener chain. It is desired to cut away the head portion of the length of coil to be removed without injuring the inner edges of the tapes T1 and T2 which overlap the portions which are to be cut away. The groove 76 will permit the interlocking coils to hinge downwardly to some such position as shown in FIG. 7 during the cutting operation. This permits the cutting blade to pass between the tapes without injuring them to any extent.

What I claim is:
1. In a machine for cutting gaps in continuous zipper chain having two interlocked plastic filament coils, the combination of
  (a) coil cutting tools;
  (b) means for guiding the zipper chain between said cutting tools;
  (c) a stop against which the leading end of the zipper chain may be placed to locate the chain in approximately the desired cutting position;
  (d) a transverse slide mounted closely adjacent said cutting tools and having projecting means on its end adapted to move between a pair of adjacent coil convolutions for more precisely locating the chain in relation to the cutting tools; and
  (e) means for operating said transverse slide into and out of engagement with one of the coils of said zipper chain.

2. The combination defined in claim 1, together with means located to that side of said cutting tools opposite said transverse slide for applying tension to said chain upon engagement of the end of said slide with said coil.

3. The combination of claim 1, wherein said projecting means on the end of said transverse slide comprises a plurality of wedge-shaped teeth adapted to wedge into a plurality of spaces between the coil convolutions.

4. The combination defined in claim 1 wherein said coil cutting tools include a die having an elongated slot adapted to underlie a longitudinally extending control portion of said chain, and a cutting blade having cutting edges along opposite sides, said blade being relieved at one side so that one cutting edge is slightly longer than the other whereby the cut end of one coil will extend beyond the cut end of the other coil a distance approximately equal to half the coil pitch.

5. The combination defined in claim 1, wherein said means for operating the transverse slide includes a bar extending generally parallel to the zipper chain, cooperating cam means carried by said bar and transverse slide, and means for shifting said bar.

6. The combination defined in claim 1 wherein said means for operating the transverse slide includes a bar extending generally parallel to the zipper chain, co-operating cam means carried by said bar and transverse slide, means for shifting said bar, and a tensioning device carried by said bar having means movable into engagement with said zipper chain when said bar is shifted in that direction where said transverse slide moves into engagement with the zipper chain.

References Cited by the Examiner

UNITED STATES PATENTS

| 3,128,543 | 4/1964 | Fasciano | 29—200 |
| 3,129,498 | 4/1964 | Runnels | 29—200 |
| 3,225,430 | 12/1965 | Fasciano | 29—408 |

JOHN F. CAMPBELL, *Primary Examiner.*

THOMAS H. EAGER, *Examiner.*